United States Patent
Liu

(10) Patent No.: US 11,770,069 B2
(45) Date of Patent: Sep. 26, 2023

(54) RESONANT CONVERTER WITH PRECISE FEEDBACK CONTROL AND CONTROL METHOD THEREOF

(71) Applicant: Chengdu Monolithic Power Systems Co., Ltd., Chengdu (CN)

(72) Inventor: Pengfei Liu, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 103 days.

(21) Appl. No.: 17/501,316

(22) Filed: Oct. 14, 2021

(65) Prior Publication Data

US 2022/0166327 A1    May 26, 2022

(30) Foreign Application Priority Data

Nov. 20, 2020   (CN) .......................... 202011316454.1

(51) Int. Cl.
  *H02M 3/00*   (2006.01)
  *H02M 1/00*   (2006.01)
  *H02M 3/335*   (2006.01)

(52) U.S. Cl.
  CPC ........... *H02M 3/01* (2021.05); *H02M 1/0025* (2021.05); *H02M 3/33571* (2021.05)

(58) Field of Classification Search
  CPC ......... H02M 1/0025; H02M 3/01–015; H02M 3/335–33592
  See application file for complete search history.

(56) References Cited

U.S. PATENT DOCUMENTS

| | | | |
|---|---|---|---|
| 9,379,630 B2 | 6/2016 | Miao | |
| 10,263,528 B2 | 4/2019 | Ouyang | |
| 10,425,013 B2 | 9/2019 | Ouyang | |
| 2017/0187298 A1* | 6/2017 | Lin | H02M 3/33553 |
| 2020/0007043 A1* | 1/2020 | Miao | H02M 3/33523 |
| 2020/0233442 A1* | 7/2020 | Miao | G05B 19/0423 |
| 2021/0111620 A1 | 4/2021 | Jin et al. | |
| 2022/0190718 A1* | 6/2022 | Corpuz | H02M 3/01 |
| 2022/0209665 A1* | 6/2022 | Li | H02M 1/0009 |
| 2022/0247320 A1* | 8/2022 | Stracquadaini | H02M 3/33569 |
| 2023/0022357 A1* | 1/2023 | Chen | H02M 1/0025 |

FOREIGN PATENT DOCUMENTS

| | | | | |
|---|---|---|---|---|
| CN | 108923657 A | * | 11/2018 | ............ H02M 1/088 |
| CN | 109917268 A | * | 6/2019 | ............ G01R 31/40 |

* cited by examiner

*Primary Examiner* — Fred E Finch, III
(74) *Attorney, Agent, or Firm* — Perkins Coie LLP

(57) ABSTRACT

A controller used in a resonant converter having a switching circuit and a resonant tank. The switching circuit has a high side switch and a low side switch. The controller has a feedback processing circuit for providing a reference signal based on a feedback signal. The reference signal changes at a first slope based on the feedback signal when the feedback signal is higher than a first voltage threshold, and the reference signal changes at a second slope based on the feedback signal when the feedback signal is lower than the first voltage threshold. The turning off of the high side switch is controlled by a high side off signal, which is generated based on the reference signal and a voltage sampling signal indicative a voltage across a resonant capacitor of the resonant tank.

16 Claims, 6 Drawing Sheets

RESONANT CONVERTER WITH PRECISE FEEDBACK CONTROL AND CONTROL METHOD THEREOF

CROSS-REFERENCE TO RELATED APPLICATIONS

This application claims the benefit of CN application No. 202011316454.1, filed on Nov. 20, 2020, and incorporated herein by reference.

TECHNICAL FIELD

The present invention generally relates to electronic circuits, and more particularly but not exclusively, to resonant converters, associated controllers and control methods.

BACKGROUND

In resonant converters, a switching circuit converts a direct current (DC) voltage into a square wave voltage and provides the square wave voltage to a resonant tank. The resonant tank comprises a resonant inductor and a resonant capacitor, and has a resonant frequency determined by the values of the resonant inductor and the resonant capacitor.

A pulse frequency modulation (PFM) method is generally adopted in traditional resonant converters. A resonant converter controls the switching circuit by a clock signal with a duty cycle of 50% generated through an oscillator and adjusts the frequency of the clock signal based on the output of the resonant converter. The frequency of the aforementioned square wave voltage will change based on the frequency of the clock signal, thereby causing a change in the gain of the resonant tank, and finally regulating the output of the resonant converter.

However, the existing PFM method has a narrow bandwidth and can not provide a real-time transient response to the load change, which can result in a severe output overshoot or undershoot.

SUMMARY

An embodiment of the present invention discloses a controller used in a resonant converter, the resonant converter comprises a switching circuit and a resonant tank. The switching circuit has a high side switch coupled between an input voltage and a switch node, and a low side switch coupled between the switch node and a primary reference ground. The resonant tank is coupled to the switch node and has a resonant inductor and a resonant capacitor. The controller comprises a feedback processing circuit, a comparison circuit and a switch control circuit. The feedback processing circuit is configured to receive a feedback signal indicative of an output signal of the resonant converter and provide a reference signal based on the feedback signal, wherein the reference signal changes at a first slope based on the feedback signal when the feedback signal is higher than a first voltage threshold, and the reference signal changes at a second slope based on the feedback signal when the feedback signal is lower than the first voltage threshold. The comparison circuit is configured to receive the reference signal and a voltage sampling signal indicative a voltage across the resonant capacitor, and generate a high side off signal based on the voltage sampling signal and the reference signal to control the turning off of the high side switch. The switch control circuit is configured to generate a high side control signal and a low side control signal based on the high side off signal to respectively control the high side switch and the low side switch.

An embodiment of the present invention discloses a resonant converter comprising: a switching circuit, a resonant tank, a feedback processing circuit, a comparison circuit and a switch control circuit. The switching circuit has a high side switch coupled between an input voltage and a switch node, and a low side switch coupled between the switch node and a primary reference ground. The resonant tank is coupled to the switching circuit, wherein the resonant tank has a resonant inductor and a resonant capacitor. The feedback processing circuit is configured to receive a feedback signal indicative of an output signal of the resonant converter and provide a reference signal based on the feedback signal, wherein the reference signal changes at a first slope based on the feedback signal when the feedback signal is higher than a first voltage threshold, and the reference signal changes at a second slope based on the feedback signal when the feedback signal is lower than the first voltage threshold. The comparison circuit is configured to receive the reference signal and a voltage sampling signal indicative a voltage across the resonant capacitor, and generate a high side off signal based on the voltage sampling signal and the reference signal to control the turning off of the high side switch. The switch control circuit is configured to generate a high side control signal and a low side control signal based on the high side off signal to respectively control the high side switch and the low side switch.

An embodiment of the present invention discloses a control method used in a resonant converter having a switching circuit and a resonant tank. The switching circuit has a high side switch coupled between an input voltage and a switch node, and a low side switch coupled between the switch node and a primary reference ground. The resonant tank is coupled to the switch node and has a resonant inductor and a resonant capacitor. The control method comprises the following steps: 1) sampling a voltage across the resonant capacitor to generate a voltage sampling signal; 2) generating a feedback signal based on an output signal of the resonant converter; 3) generating a reference signal based on the feedback signal, wherein the reference signal changes at a first slope based on the feedback signal when the feedback signal is higher than a first voltage threshold, and the reference signal changes at a second slope based on the feedback signal when the feedback signal is lower than the first voltage threshold; 4) generating a high side off signal by comparing the voltage sampling signal with the reference signal; and 5) controlling the turning off of the high side switch and the turning on of the low side switch based on the high side off signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
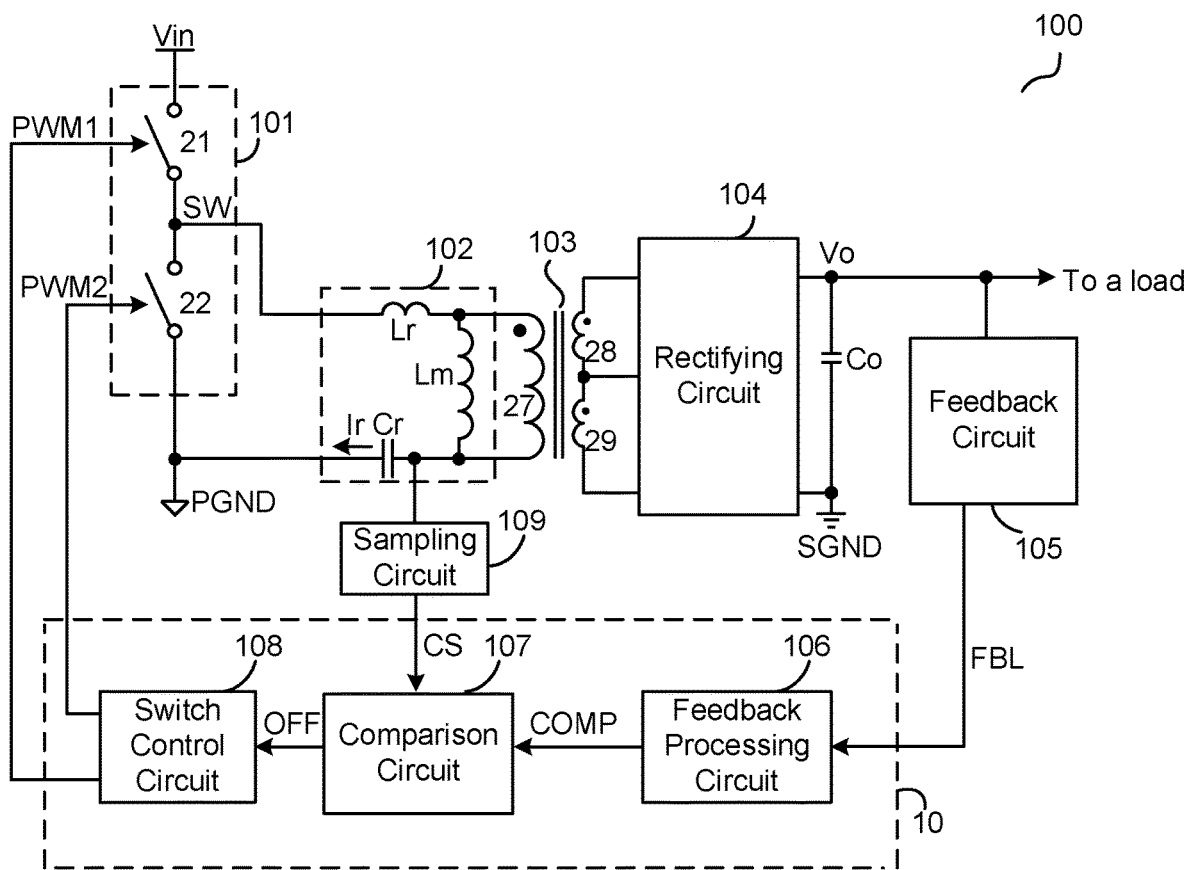
FIG. 1 is a block diagram of a resonant converter 100 in accordance with an embodiment of the present invention.

FIG. 1 is a block diagram of a resonant converter 100 in accordance with an embodiment of the present invention. The resonant converter 100 comprises a switching circuit 101, a resonant tank 102, a transformer 103, a rectifying circuit 104 and a controller 10. The switching circuit 101 comprises a high side switch 21 and a low side switch 22, wherein the high side switch 21 is coupled between an input voltage Vin and a switch node SW, the low side switch 22 is coupled between the switch node SW and a primary reference ground PGND. The resonant tank 102 is coupled between the switch node SW and a primary winding 27 of the transformer 103. The rectifying circuit 104 is coupled to secondary windings of the transformer 103 and is configured to provide an output signal to a load. In one embodiment, the resonant tank 102 comprises a resonant inductor Lr and a resonant capacitor Cr, and is coupled in series between the switch node SW and the primary winding 27 of the transformer 103. In one embodiment, the resonant inductor Lr is configured to be a leakage inductance of the primary winding 27. In other embodiments, the resonant inductor Lr can also be a discrete inductor. The transformer 103 further comprises a magnetizing inductance Lm that is coupled in parallel with a primary winding of the ideal transformer. The magnetizing inductor Lm, the resonant inductor Lr and resonant capacitor Cr construct a LLC resonant tank. As shown in FIG. 1, a resonant current Ir flowing through the resonant inductor Lr and the resonant capacitor Cr. In one embodiment, the input signal includes an input voltage Vin. In one embodiment, the output signal includes an output voltage Vo and/or an output current Io.

In one embodiment, the resonant converter 100 shown in FIG. 1 further comprises a feedback circuit 105. The feedback circuit 105 is configured to provide a feedback signal FBL based on the output signal. In one embodiment, the resonant converter 100 further comprises a sampling circuit 109 configured to sample a voltage across the resonant capacitor Cr to generate a voltage sampling signal CS. Those skilled in the art should understand that, the circuit shown in FIG. 1 is an exemplary illustration, other suitable circuit are also applicable here. In the example shown in FIG. 1, a half-bridge circuit is used as an example of the switching circuit to illustrate, in another embodiment, the switching circuit can be applied in a full-bridge circuit.

The controller 10 comprises a feedback processing circuit 106, a comparison circuit 107 and a switch control circuit 108. The feedback processing circuit 106 is configured to receive the feedback signal FBL indicative of the output signal of the resonant converter 100 and provide a reference signal COMP based on the feedback signal FBL. Wherein the reference signal COMP changes in a first changing way based on the feedback signal FBL, when the feedback signal FBL is higher than a first voltage threshold Vth1, and the reference signal COMP changes in a second changing way based on the feedback signal FBL, when the feedback signal FBL is lower than the first voltage threshold Vth1. In one embodiment, the first voltage threshold Vth1 can be adjusted. In one embodiment, the first changing way is that the reference signal COMP changes at a first slope A1 based on the feedback signal FBL, the second changing way is that the reference signal COMP changes at a second slope A2 based on the feedback signal FBL, wherein the first slope A1 is higher than the second slope A2. In another embodiment, the first slope A1 is adjustable. In one embodiment, when the first voltage threshold Vth1 increases, the first slope A1 is configured to increase accordingly.

The comparison circuit 107 is configured to receive the reference signal COMP and the voltage sampling signal CS indicative of the voltage across the resonant capacitor Cr. Based on the voltage sampling signal CS and the reference signal COMP, the comparison circuit 107 is configured to generate a high side off signal OFF to turn off the high side switch 21 in the switching circuit 101.

The switch control circuit 108 is configured to generate a high side control signal PWM1 and a low side control signal PWM2 based on the high side off signal OFF to respectively control the high side switch 21 and the low side switch 22. Ideally, the high side switch 21 and the low side switch 22 are turned ON alternatingly and complementarily. The switch control circuit 108 is configured to control the turning off of the high side switch 21 and the turning on of the low side switch 22 based on the high side off signal OFF. The switch control circuit 108 is configured to sense the on-time of the high side switch 21, and then turn off the low side switch 22 and turn on the high side switch 21 when the on-time of the low side switch 22 becomes equal to the sensed on-time of the high side switch 21.

Figure 2:
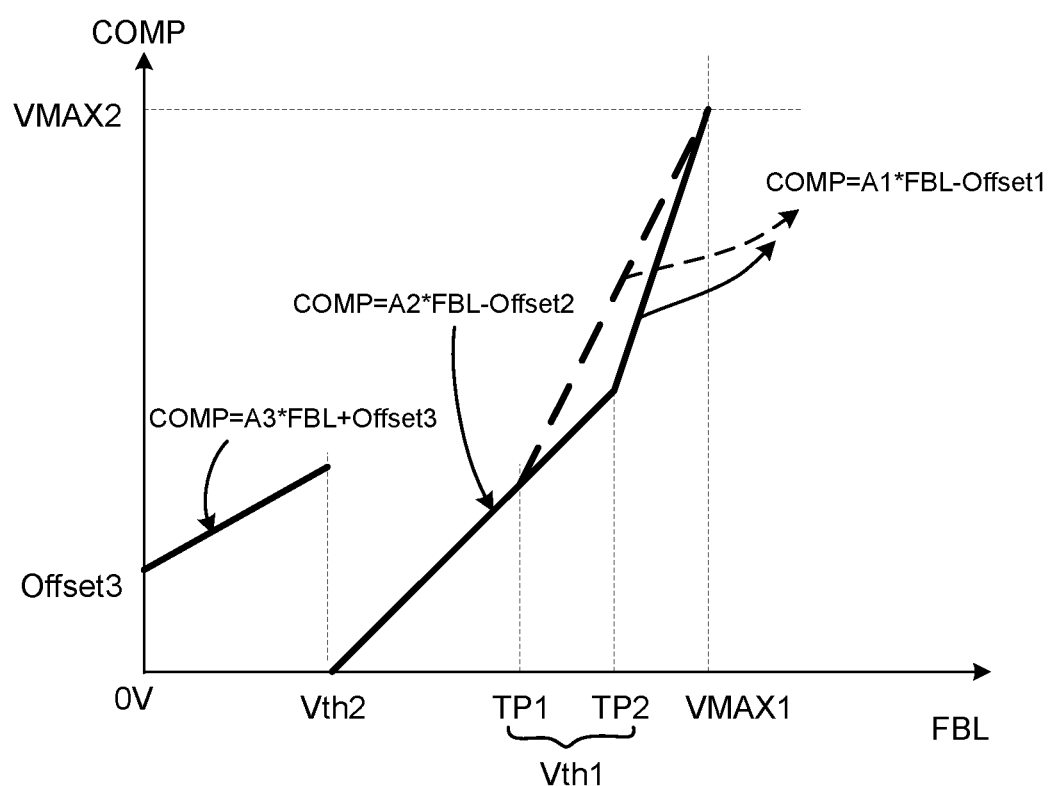
FIG. 2 is a relationship curve between a feedback signal FBL and a reference signal COMP in accordance with an embodiment of the present invention.

FIG. 2 is a relationship curve between a feedback signal FBL and a reference signal COMP in accordance with an embodiment of the present invention. In the example shown in FIG. 2, the abscissa stands for the feedback signal FBL and the ordinate stands for the reference signal COMP, wherein the maximum value of the feedback signal FBL is VMAX1 and the maximum value of the reference signal COMP is VMAX2. As shown in FIG. 2, the first voltage threshold Vth1 can be set with different values. For example, Vth1 can be equal to TP1 or TP2, wherein TP1 is lower than TP2. In one embodiment, when the feedback signal FBL is higher than the first voltage threshold Vth1, the reference signal COMP is equal to the product of the feedback signal FBL and the first slope A1 minus a first offset value Offset1, i.e., COMP=A1*FBL−Offset1. In one embodiment, when the feedback signal FBL is lower than the first voltage threshold Vth1, the reference signal COMP is equal to the product of the feedback signal FBL and the second slope A2 minus a second offset value Offste2, i.e., COMP=A2*FBL−Offset2. In the example shown in FIG. 2, when the first voltage threshold Vth1 increases, the first slope A1 is configured to increase accordingly, and the first offset value Offset1 increases too. In one embodiment, when the feedback signal FBL is lower than a second voltage threshold Vth2, the resonant converter 100 works on discontinuous current mode (DCM), the reference signal COMP changes at a third slope A3 based on the feedback signal FBL, wherein the second voltage threshold Vth2 is lower than the first voltage threshold Vth1. In one embodiment, when the feedback signal FBL is lower than the second voltage threshold Vth2, the reference signal COMP is equal to the product of the feedback signal FBL and the second slope A3 plus a third offset value Offste3, i.e., COMP=A3*FBL+Offset3.

The reference signal COMP in the embodiments of the present invention can change in a wide range, which can support a high power output and ensure the accuracy of control in a small power range at the same time.

Figure 3:
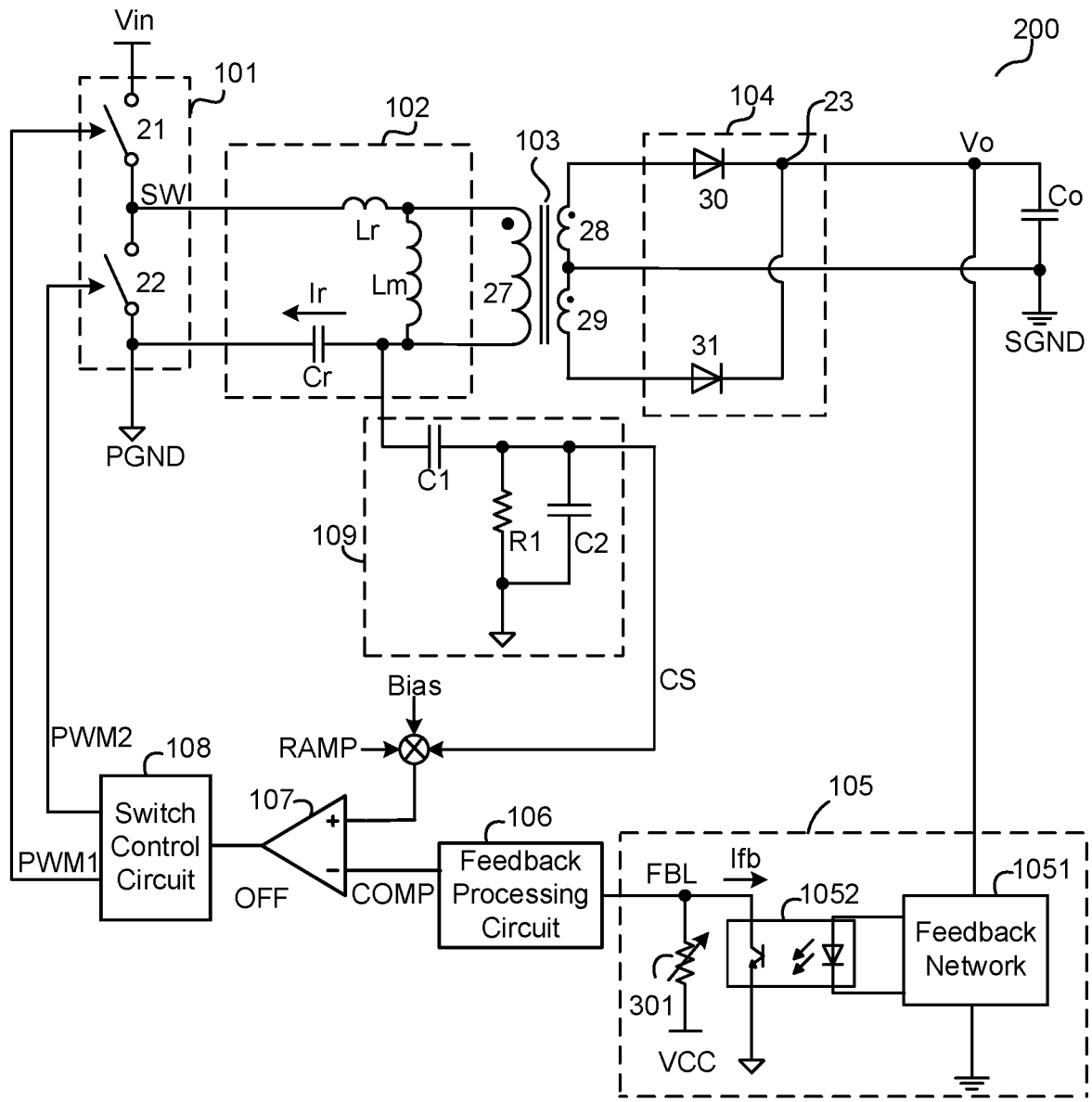
FIG. 3 is a block diagram of a resonant converter 200 in accordance with another embodiment of the present invention.

FIG. 3 is a block diagram of a resonant converter 200 in accordance with another embodiment of the present invention. In the example shown in FIG. 3, the rectifying circuit 104 is configured to rectify the voltage across the secondary windings 28 and 29, and provide the output voltage Vo at an output terminal 23. The rectifying circuit 104 comprises rectifying switches 30 and 31, wherein the rectifying switch 30 is coupled between the secondary winding 28 and the output terminal 23, the rectifying switch 31 is coupled between the secondary winding 29 and the output terminal 23, a common terminal of the secondary winding 28 and the secondary winding 29 is coupled to a secondary reference ground SGND. In one embodiment, the rectifying switches 30 and 31 can comprise diodes or field effect transistors (FETs). Those skilled in the art should understand that, the example shown in FIG. 3 is not intended to limit the specific structure of the rectifying circuit 104, rectifying circuits with other suitable structures also applicable.

In the example shown in FIG. 3, the feedback circuit 105 comprises a feedback network 1051, an opto-coupler 1052 and a resistor 301. The feedback network 1051 comprises but not exclusively resistors, capacitors and so on. A current Ifb flowing through a photosensitive element in the opto-coupler 1052 is generated based on the output voltage Vo and then converted into the feedback signal FBL through the resistor 301. The resistor 301 has a first terminal coupled to a power supply voltage VCC and a second terminal coupled to the opto-coupler 1052 and is configured to generate the feedback signal FBL.

The sampling circuit 109 can comprise sampling resistors, capacitors, transducers and so on. In the example shown in FIG. 3, the sampling circuit 109 comprises a resistor R1 and capacitors C1~C2. The capacitor C1 has a first terminal and a second terminal, wherein the first terminal is coupled to the resonant capacitor Cr and the second terminal is configured to provide the voltage sampling signal CS. The resistor R1 and the capacitor C1 is coupled in parallel between the second terminal of the capacitor C1 and the primary reference ground PGND.

The comparison circuit 107 is coupled to the feedback processing circuit 106 and the sampling circuit 109, and is configured to compare the voltage sampling signal CS with the reference signal COMP and generate the high side off signal OFF. In one embodiment, to keep steady operation of the system, a compensation signal RAMP is added to the voltage sampling signal CS. A sum of the voltage sampling signal CS and the compensation signal RAMP is compared with the reference signal COMP to generate the high side off signal OFF. In one embodiment, a bias voltage Bias is further added to the voltage sampling signal CS to counteract the influence caused by imbalance voltage of the comparison circuit 107. A sum of the voltage sampling signal CS, the compensation signal RAMP and the bias voltage Bias is compared with the reference signal COMP to generate the high side off signal OFF.

Figure 4:
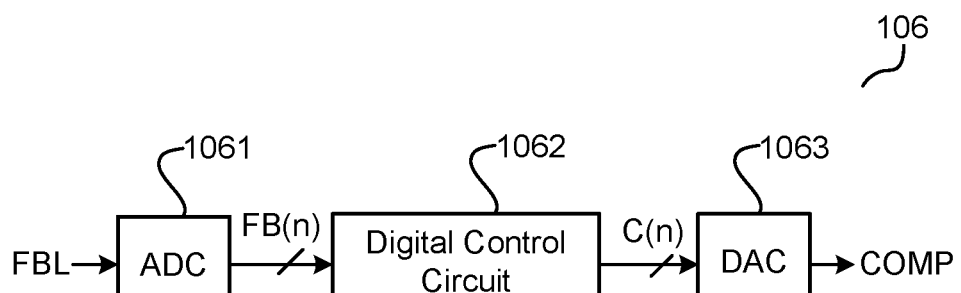
FIG. 4 is a block diagram of a feedback processing circuit 106 shown in FIG. 3, in accordance with an embodiment of the present invention.

FIG. 4 is a block diagram of a feedback processing circuit 106 shown in FIG. 3, in accordance with an embodiment of the present invention. In the example shown in FIG. 4, the feedback processing circuit 106 comprises an analog-to-digital converter (ADC) 1061, a digital control circuit 1062 and a digital-to-analog converter (DAC) 1063. The ADC 1061 is configured to receive the feedback signal FBL and generate a digital feedback signal FB(n) to the digital control circuit 1062 by analog-to-digital converting. The digital control circuit 1062 is configured to generate a digital reference signal C(n) based on the digital feedback signal FB(n). The DAC 1063 is configured to receive the digital reference signal C(n) and generate the reference signal COMP by digital-to-analog converting. Those skilled in the art should understand that the example shown in FIG. 4 is not intended to limit the specific structure of the feedback processing circuit 106, other suitable structure can be used too. For example, an analog circuit can also be used for realizing the feedback processing circuit 106.

Figure 5:
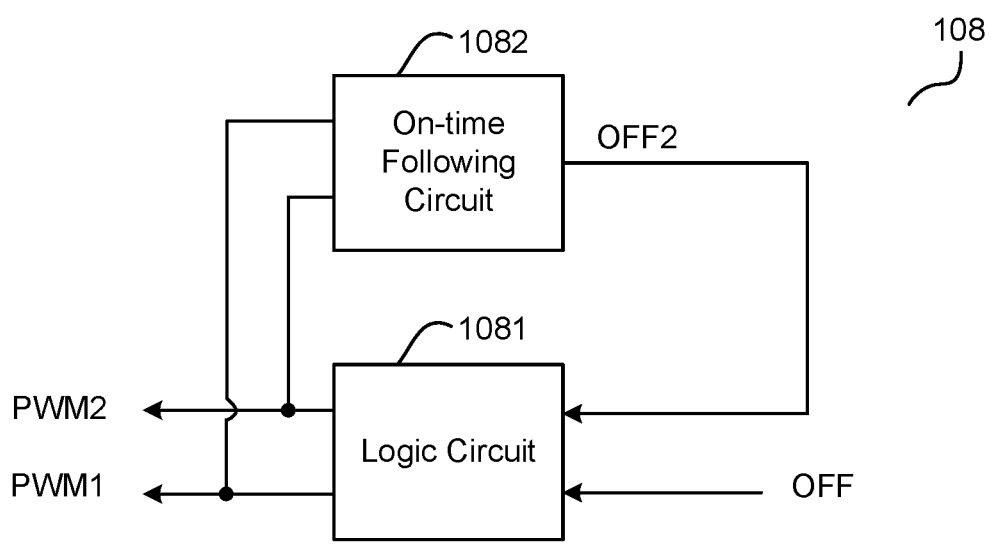
FIG. 5 is a block diagram of a switch control circuit 108 shown in FIG. 3, in accordance with an embodiment of the present invention.

FIG. 5 is a block diagram of a switch control circuit 108 shown in FIG. 3, in accordance with an embodiment of the present invention. In the example shown in FIG. 5, the switch control circuit 108 comprises a logic circuit 1081 and an on-time following circuit 1082. The on-time following circuit 1082 is configured to receive the high side control signal PWM1 and the low side control signal PWM2, and sense the on-time of the high side switch 21 based on the high side control signal PWM1. Based on the low side control signal PWM2 and the sensed on-time of the high side switch 21, the on-time following circuit 1082 generates a low side off signal OFF2. The logic circuit 1081 is coupled to the comparison circuit 107 and the on-time following circuit 1082, and is configured to generate the high side control signal PWM1 and the low side control signal PWM2 based on the high side off signal OFF and the low side off signal OFF2.

Figure 6:
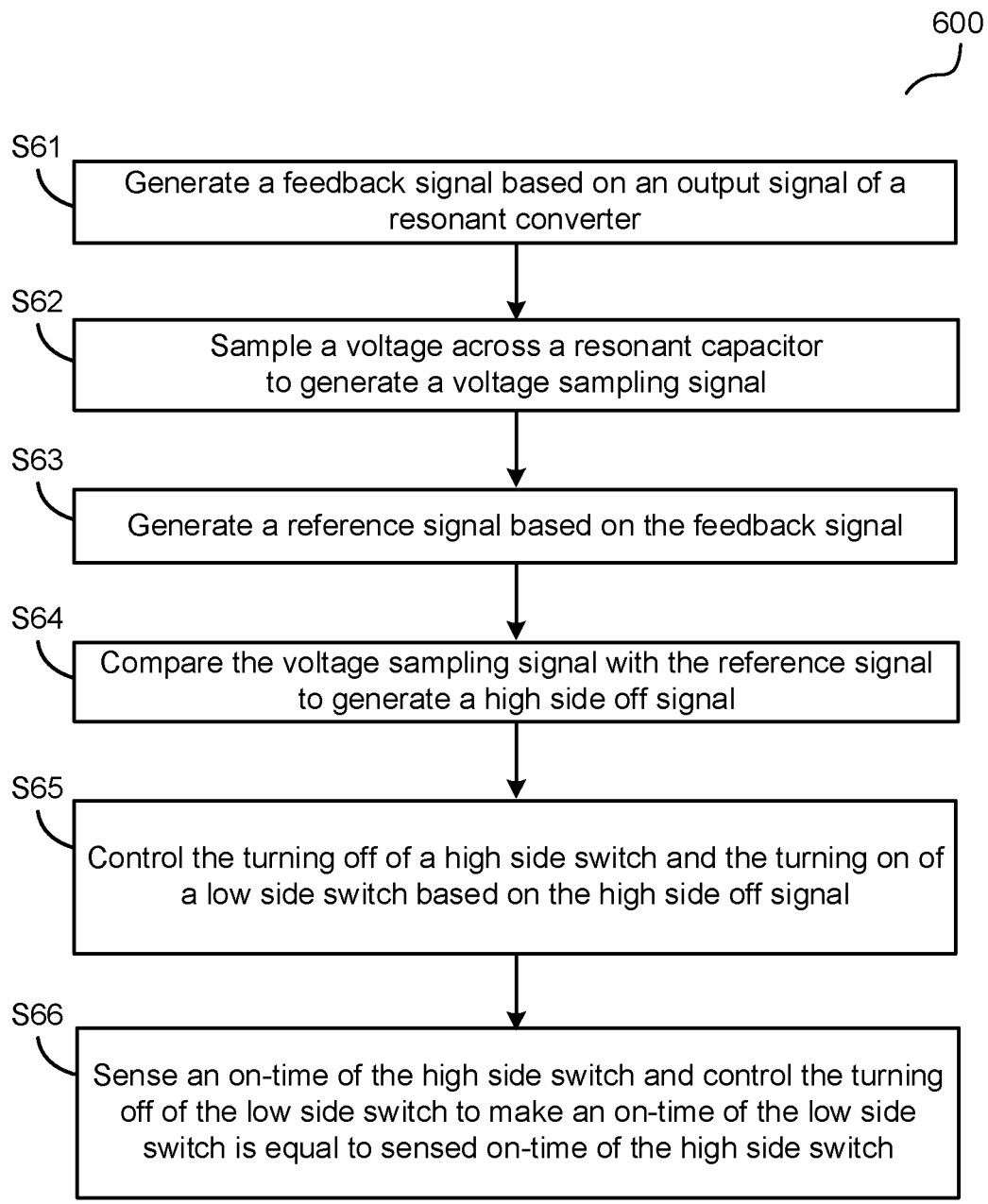
FIG. 6 is a flowchart of a control method 600 used in a resonant converter in accordance with an embodiment of the present invention.

FIG. 6 is a flowchart of a control method 600 used in a resonant converter in accordance with an embodiment of the present invention. The method 600 includes steps S61~S66. The resonant converter comprises a switching circuit and a resonant tank, wherein the switching circuit has a high side switch coupled between an input voltage and a switch node, and a low side switch coupled between the switch node and a primary reference ground. The resonant tank is coupled to the switch node, and has a resonant inductor and a resonant capacitor.

At step S61, a feedback signal is generated based on an output signal of the resonant converter.

At step S62, a voltage across the resonant capacitor is sampled to generate a voltage sampling signal.

At step S63, a reference signal is generated based on the feedback signal.

At step S64, the voltage sampling signal is compared with the reference signal to generate a high side off signal.

At step S65, the turning off of the high side switch and the turning on of the low side switch is controlled based on the high side off signal.

At step S66, the on-time of the high side switch is sensed and the turning off of the low side switch is controlled based on the sensed on-time of the high side switch to make the on-time of the low side switch is equal to the sensed on-time of the high side switch.

Figure 7:
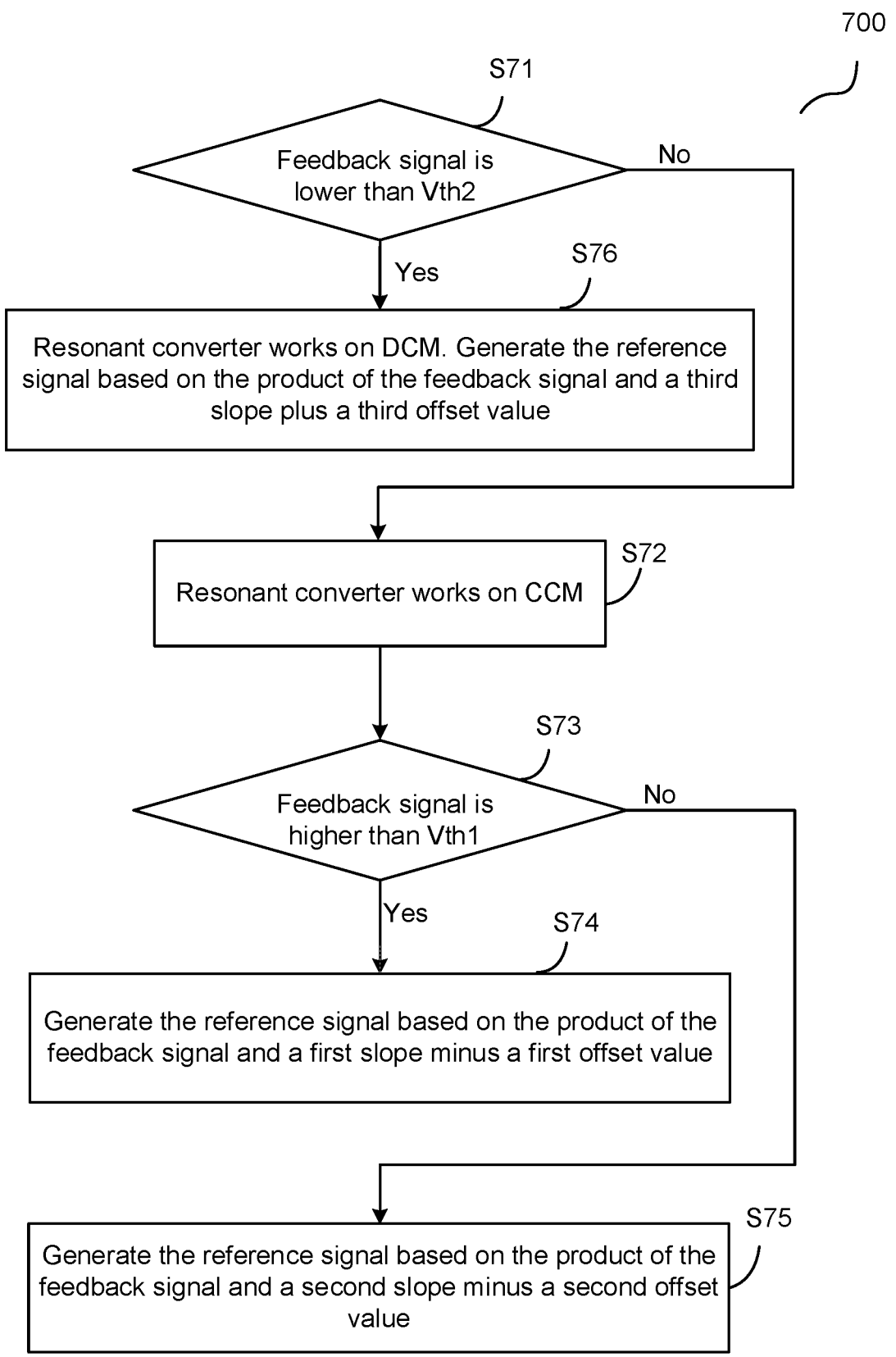
FIG. 7 is a flowchart of a method 700 for generating a reference signal in accordance with an embodiment of the present invention.

FIG. 7 is a flowchart of a method 700 for generating a reference signal in accordance with an embodiment of the present invention. The method 700 includes steps S71~S76.

At step S71, determining whether the feedback signal is lower than a second voltage threshold Vth2. If the feedback signal is lower than the second voltage threshold Vth2, the process will go to step S76. Otherwise, the process will go to step S72.

At step S72, the resonant converter works on continuous conduction mode (CCM).

At step S73, determining whether the feedback signal is higher than a first voltage threshold Vth1. If the feedback signal is higher than the first voltage threshold Vth1, the process will go to step S74. Otherwise, the process will go to step S75.

At step S74, the reference signal is generated based on the product of the feedback signal and a first slope minus a first offset value.

At step S75, the reference signal is generated based on the product of the feedback signal and a second slope minus a second offset value.

At step S76, the resonant converter works on discontinuous conduction mode (DCM). The reference signal is generated based on the product of the feedback signal and a third slope plus a third offset value.

In one embodiment, the first voltage threshold Vth1 can be adjusted. In one embodiment, the first slope is higher than the second slope and increases based on the increase of the first voltage threshold Vth1.

In the flowchart described above, the function marked in the boxes can be performed in an order different from that shown in the FIG. 7. For example, two successive boxes can actually be performed in parallel. They can also be performed in opposite order sometimes, it depends on the specific function involved in practical requirements.

Although many detailed circuits are shown in the embodiments above, it is apparent to persons of ordinary skills in the art that, these detailed circuits are only used for illustration purpose only, and are not intended to limit the present invention. Other suitable circuit structure with same or similar function could also be utilized. Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a resonant converter having a switching circuit and a resonant tank, wherein the switching circuit has a high side switch and a low side switch, the controller comprising:

a feedback processing circuit configured to receive a feedback signal indicative of an output signal of the resonant converter and provide a reference signal based on the feedback signal, wherein the reference signal changes at a first slope based on the feedback signal when the feedback signal is higher than a first voltage threshold, and the reference signal changes at a second slope based on the feedback signal when the feedback signal is lower than the first voltage threshold, wherein the first slope is higher than the second slope;

a comparison circuit configured to receive the reference signal and a voltage sampling signal indicative of a voltage across a resonant capacitor of the resonant tank, and generate a high side off signal to control the turning-off of the high side switch based on the voltage sampling signal and the reference signal; and a switch control circuit configured to generate respectively a high side control signal and a low side control signal to control the high side switch and the low side switch based on the high side off signal.

2. The controller of claim 1, wherein when the feedback signal is higher than the first voltage threshold, the feedback processing circuit is configured to generate the reference signal based on the product of the feedback signal and the first slope minus a first offset value; and when the feedback signal is lower than the first voltage threshold, the feedback processing circuit is configured to generate the reference signal based on the product of the feedback signal and the second slope minus a second offset value.

3. The controller of claim 1, wherein the reference signal changes at a third slope based on the feedback signal when the feedback signal is lower than a second voltage threshold, wherein the second voltage threshold is lower than the first voltage threshold.

4. The controller of claim 3, wherein when the feedback signal is lower than the second voltage threshold, the feedback processing circuit is configured to generate the reference signal based on the product of the feedback signal and the third slope plus a third offset value.

5. The controller of claim 1, wherein the first slope is configured to increase when the first voltage threshold increases.

6. The controller of claim 1, wherein the feedback processing circuit further comprises:

an analog-to-digital converter configured to receive the feedback signal and generate a digital feedback signal based on the feedback signal by analog-to-digital converting;

a digital control circuit configured to receive the digital feedback signal and generate a digital reference signal based on the digital feedback signal; and a digital-to-analog converter configured to receive the digital reference signal and generate the reference signal by digital-to-analog converting.

7. A resonant converter, comprising:

a switching circuit having a high side switch coupled between an input voltage and a switch node, and a low side switch coupled between the switch node and a primary reference ground;

a resonant tank coupled to the switching circuit;

a feedback processing circuit configured to receive a feedback signal indicative of an output signal of the resonant converter and provide a reference signal based on the feedback signal, wherein the reference signal changes at a first slope based on the feedback signal when the feedback signal is higher than a first voltage threshold and the reference signal changes at a second slope based on the feedback signal when the feedback signal is lower than the first voltage threshold, wherein the first slope is higher than the second slope;

a comparison circuit configured to receive the reference signal and a voltage sampling signal indicative a voltage across a resonant capacitor of the resonant tank, and generate a high side off signal to turn off the high side switch based on the voltage sampling signal and the reference signal; and a switch control circuit configured to generate respectively a high side control signal and a low side control signal to control the high side switch and the low side switch based on the high side off signal.

8. The resonant converter of claim 7, wherein when the feedback signal is higher than the first voltage threshold, the feedback processing circuit is configured to generate the reference signal based on the product of the feedback signal and the first slope minus a first offset value; and when the feedback signal is lower than the first voltage threshold, the feedback processing circuit is configured to generate the reference signal based on the product of the feedback signal and the second slope minus a second offset value.

9. The resonant converter of claim 7, wherein the reference signal changes at a third slope based on the feedback signal when the feedback signal is lower than a second voltage threshold, wherein the second voltage threshold is lower than the first voltage threshold.

10. The resonant converter of claim 9, wherein when the feedback signal is lower than the second voltage threshold, the feedback processing circuit is configured to generate the reference signal based on the product of the feedback signal and the third slope plus a third offset value.

11. The resonant converter of claim 7, wherein the first slope is configured to increase when the first voltage threshold increases.

12. The resonant converter of claim 7, wherein the feedback processing circuit further comprises:

an analog-to-digital converter configured to receive the feedback signal and generate a digital feedback signal based on the feedback signal by analog-to-digital converting;

a digital control circuit configured to receive the digital feedback signal and generate a digital reference signal based on the digital feedback signal; and a digital-to-analog converter configured to receive the digital reference signal and generate the reference signal by digital-to-analog converting.

13. A control method used in a resonant converter having a switching circuit and a resonant tank, wherein the switching circuit has a high side switch and a low side switch, the control method comprising:

sampling a voltage across a resonant capacitor of the resonant tank to generate a voltage sampling signal;

generating a feedback signal based on an output signal of the resonant converter;

generating a reference signal based on the feedback signal, wherein the reference signal changes at a first slope based on the feedback signal when the feedback signal is higher than a first voltage threshold, and the reference signal changes at a second slope based on the feedback signal when the feedback signal is lower than the first voltage threshold, wherein the first slope is higher than the second slope;

comparing the voltage sampling signal with the reference signal to generate a high side off signal; and controlling the turning off of the high side switch and the turning on of the low side switch based on the high side off signal.

14. The control method of claim 13, wherein generating the reference signal based on the product of the feedback signal and the first slope minus a first offset value when the feedback signal is higher than the first voltage threshold; and generating the reference signal based on the product of the feedback signal and the second slope minus a second offset value when the feedback signal is lower than the first voltage threshold.

15. The control method of claim 13, wherein the reference signal changes at a third slope based on the feedback signal when the feedback signal is lower than a second voltage threshold, wherein the second voltage threshold is lower than the first voltage threshold.

16. The control method of claim 13, wherein generating the reference signal based on the product of the feedback signal and a third slope plus a third offset value when the feedback signal is lower than a second voltage threshold, wherein the second voltage threshold is lower than the first voltage threshold.

* * * * *